United States Patent [19]

Miyashita et al.

[11] Patent Number: 4,486,568

[45] Date of Patent: Dec. 4, 1984

[54] RESIN COMPOSITION

[75] Inventors: Shunitsu Miyashita, Kobe; Akiyoshi Somemiya, Akashi, both of Japan

[73] Assignee: Kanegafuchi Kagaku Kogyo Kabushiki Kaisha, Osaka, Japan

[21] Appl. No.: 453,917

[22] Filed: Dec. 28, 1982

[30] Foreign Application Priority Data

Dec. 28, 1981 [JP] Japan .................. 56-5313

[51] Int. Cl.³ ............................. C08L 51/08
[52] U.S. Cl. ................... 525/63; 525/391; 525/392; 525/905
[58] Field of Search ............ 525/63, 905, 64

[56] References Cited

U.S. PATENT DOCUMENTS 4,132,684  1/1979  Izawa et al. ............ 525/68

FOREIGN PATENT DOCUMENTS 0025200  3/1981  European Pat. Off. .
52-30991  8/1977  Japan .
55-137130 10/1980  Japan .

*Primary Examiner*—Jacob Ziegler
*Attorney, Agent, or Firm*—Antonelli, Terry & Wands

[57] ABSTRACT

A resin composition comprising (A) a modified polyphenylene oxide prepared by graft polymerization of an acrylonitrile compound or a monomer mixture containing acrylonitrile compound and a styrene compound in the presence of polyphenylene oxide and (B) a polymer having units of an acrylonitrile compound and being compatible with the modified polyphenylene oxide (A). The composition has excellent heat resistance, mechanical property, impact resistance, solvent resistance, antioxidation property and transparency.

13 Claims, No Drawings

RESIN COMPOSITION

BACKGROUND OF THE INVENTION

The present invention relates to a resin composition containing a modified polyphenylene oxide and having excellent heat resistance, mechanical property, impact resistance, solvent resistance (especially resistance to hydrocarbons) and transparency.

Polyphenylene oxide (hereinafter referred to as "PPO") is a resin having excellent heat resistance and mechanical and electric characteristics, but in some uses it is sufficient in impact resistance, processability, solvent resistance and antioxidation property.

In order to eliminate the above defects, it is proposed in U.S. Pat. No. 3,383,435 to blend PPO with polystyrene or a modified polystyrene. The blend has improved impact resistance, processability and antioxidation property, but this technique is insufficient for improving the solvent resistance.

The solvent resistance of PPO can be improved by blending PPO with an acrylonitrile-styrene polymer (AS resin) or an acrylonitrile-butadiene-styrene polymer (ABS resin) instead of polystyrene or the modified polystyrene. However, the impact resistance and the mechanical property are lowered and the antioxidation property is not improved. This fact indicates that PPO is poor in compatibility with the AS resin or ABS resin and mere blending does not provide an available resin composition. The antioxidation property is not improved so far as PPO is blended with a resin incompatible therewith. If the AS resin or ABS resin would be compatible with PPO, mechanical properties such as tensile strength and toughness, impact resistance and other properties that the AS resin or ABS resin stands at advantage over polystyrene or a high impact polystyrene, would be improved as well as the solvent resistance. However, it is understood that PPO and the AS resin are not compatible, from the fact that if they are admixed, the mixture becomes opaque. For instance, if each of an AS resin containing about 5% by weight of acrylonitrile and PPO is dissolved in an equal amount of cloroform and a casting film is prepared from the mixture thereof, the film is opaque. Also, if a casting film is prepared in the same manner as above by employing an AS resin having an acrylonitrile content of about 20% by weight, the surface becomes very rough and no film is prepared. Even if PPO is blended with an AS resin having an acrylonitrile content of less than 5% by weight, marked improvement in solvent resistance is not expected.

Graft polymerization of an AS resin onto PPO is available for raising the compatibility of PPO with AS resin or ABS resin to provide a practical resin composition of PPO and the AS resin or ABS resin.

A graft polymerization technique of acrylonitrile onto PPO is disclosed in Japanese Examined Patent Publication (Tokkyo Kokoku) No. 41383/1971. This publication proposes an anionic graft polymerization using an alkali metal. In case of employing monomers, e.g. styrene and acrylonitrile, which are largely different in electronegativity from each other, it is difficult to prepare a random graft copolymer by an anionic graft polymerization. Therefore, a modified PPO as obtained by grafting an acrylonitrile-styrene copolymer onto PPO according to this technique, namely acrylonitrile-styrene grafted polyphenylene oxide (hereinafter referred to as "ASGPPO"), is not compatible with industrially used usual AS resins. Japanese Unexamined Patent Publication (Tokkyo Kokai) No. 115260/1975 and No. 137130/1980 propose blending of a modified PPO prepared by graft polymerization of an AS resin onto PPO with an AS resin. These ASGPPO resins are in a uniform dispersion state as shown in FIG. 1 of the Japanese Publication No. 137130/1980, and the PPO portion and the AS resin portion are not compatible with each other. Even if the ASGPPO resin is blended with AS resin, no transparent resin composition is obtained. In that case, two loss peaks derived from the respective components are observed in dynamic mechanical measurement.

It is an object of the present invention to improve the solvent resistance, antioxidation property and impact resistance of PPO without impairing excellent characteristics of PPO such as heat resistance, mechanical property and electric characteristics.

A further object of the invention is to provide a resin composition containing a modified PPO.

A still further object of the invention is to provide a resin composition having excellent solvent resistance, antioxidation property, impact resistance, heat resistance, mechanical property, electric characteristics and transparency.

These and other objects of the present invention will become apparent from the description hereinafter.

SUMMARY OF THE INVENTION

It has now been found that when a modified PPO having a high degree of graft modification is blended with an acrylonitrile-styrene copolymer of acrylonitrile-butadiene-styrene copolymer, the above-mentioned objects is attained and there is obtained a useful resin composition having well balanced solvent resistance, antioxidation property, tensile strength, impact resistance and toughness and being usable in a wide range of purposes. In the present invention, that the degree of graft modification is high means that not only the rate of grafting is large, but also the nonmodified PPO, namely free PPO, is a little. It must also be considered that in what state the grafting polymer grafts onto PPO.

In accordance with the present invention, there is provided a resin composition comprising (A) 1 to 99 parts by weight of a modified polyphenylene oxide prepared by graft polymerization of an acrylonitrile compound or a monomer mixture containing an acrylonitrile compound and a styrene compound in the presence of polyphenylene oxide, said modified polyphenylene oxide having a high degree of graft modification such that the degree of graft modification as determined by a methylene chloride test is at least 48 hours, and (B) 99 to 1 parts by weight of a polymer containing units of an acrylonitrile compound and being compatible with said modified polyphenylene oxide (A).

The composition of the present invention comprehends a composition which is transparent and has a single loss peak as observed in dynamic mechanical measurement, in other words, a composition which does not indicate loss peaks derived from α-transitions of the components (A) and (B), but indicates a single loss peak showing α-transition inherent to the composition.

DETAILED DESCRIPTION

PPO (polyphenylene oxide) used in the present invention is a polymer having recurring units represented substantially by the general formula:

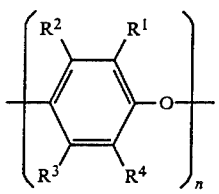

wherein $R^1$, $R^2$, $R^3$ and $R^4$ are hydrogen, a hydrocarbon group, a substituted hydrocarbon group, a halogen, a hydrocarbonoxy group, a substituted hydrocarbonoxy group, an amino group or a substituted amino group, and n is an integer of not less than 50. Preferably, the number of recurring units n is from 100 to 250, especially from 120 to 200. The term "substantially" as used above means that the PPO resin may contain a minor amount, preferably not more than 30% by mole, of units of a comonomer other than phenylene oxide. Representative examples of the PPO resin are poly(2,6-dimethylphenylene-1,4-ether), poly(2,6-diethylphenylene-1,4-ether), poly(2,6-dipropylphenylene-1,4-ether), poly(2-methyl-6-allylphenylene-1,4-ether), poly(2,6-dimethoxyphenylene-1,4-ether), poly(2-methyl-6-chlorophenylene-1,4-ether), poly(2,6-dichloromethylphenylene-1,4-ether), poly(2-methyl-6-bromophenylene-1,4-ether), poly(2,5-dimethylphenylene-1,4-ether), poly(2,6-diphenylphenylene-1,4-ether), and copolymers thereof. The PPO resins used in the invention also include polyphenylene oxide copolymers having units of nitrogen-containing compounds such as aniline compounds as disclosed in U.S. Pat. No. 4,335,233.

An acrylonitrile compound or a monomeric mixture of an acrylonitrile compound and a styrene compound is polymerized in the presence of the PPO resin to graft acrylonitrile or an acrylonitrile-styrene onto the PPO resin. The graft polymerization can be conducted by any polymerization methods such as emulsion polymerization, bulk polymerization and gas phase graft polymerization. The monomer or monomers to be graft-polymerized may contain other vinyl compounds copolymerizable with the acrylonitrile compound or the styrene compound. In the present invention, the graft polymer so obtained, namely modified PPO, is blended with a copolymer containing units of an acrylonitrile compound such as a copolymer of an acrylonitrile compound and a styrene compound (hereinafter referred to as "AS resin"). The AS resin may further contain units of other vinyl monomers copolymerizable with the acrylonitrile compound or the styrene compound for the purpose of increasing the compatibility with the modified PPO.

The acrylonitrile compound used in the present invention includes acrylonitrile, methacrylonitrile, and the like. The styrene compound used in the present invention includes styrene, alkyl-substituted styrene derivatives, halogen-substituted styrene derivatives and other styrene derivatives. Typical examples of the styrene compound are styrene, monochlorostyrene, dichlorostyrene, α-methylstyrene, p-methylstyrene, p-phenylstyrene and 2,4-dimethylstyrene.

A general method for determining the degree of graft modification of the modified PPO is a methylene chloride test as disclosed in J. OF POLYMER SCIENCE, 7B, 205(1969). This method utilizes the fact that if PPO is dissolved in methylene chloride, PPO and methylene chloride forms a complex insoluble in methylene chloride and the complex is precipitated. If no precipitate is produced when the modified PPO is dissolved in methylene chloride, PPO is construed to have been modified with losing its characteristics. Therefore, the longer the time up to the precipitation, the higher the degree of modification. In Japanese Examined Patent Publication No. 38596/1977, the methylene choride test is conducted within the time period of 3 to 24 hours. According to the present inventors' investigation, however, the modified PPO with a degree of modification as estimated by such a degree of time is extremely lacking in compatibility with the AS resin. In that case, the glass transition temperature of the composition is not single and also the composition does not become transparent. Also, the mechanical property is lowered. In the present invention, it is necessary that the degree of modification of the modified PPO is such that no precipitate-forming time in the methylene chloride test conducted at 23° C. by employing a 5 w/v % methylene chloride solution is at least 48 hours. Preferably, the degree of modification as determined by the methylene test is at least 72 hours. The modified PPO showing a slight turbidity after 48 hours in the methylene chloride test is also usable in the present invention, since effects on improvement in antioxidation property, mechanical property and solvent resistance are observed in blending with the AS resin.

In the present invention, the compatibility of the modified PPO (A) with the component (B) can be judged be measuring the transparency of a composition consisting of only the components (A) and (B). That is to say, when the haze value measured according to JIS K 7105 (thickness of specimen: 1.0 mm.) is not more than 5.0%, the both are regarded as being compatible with each other. The composition of the present invention is transparent, but in case of incorporating other additives such as a rubber and a pigment into the composition, it is a matter of course that the composition becomes opaque. In the present invention, the compatibility of the composition consisting of the components (A) and (B) can also be judged by dynamic mechanical measurement. For instance, it can be judged by measuring the glass transition temperature by a TBA method. The TBA method may be made according to ISO R-537. In case that the components (A) and (B) have the compatibility with each other, loss peaks derived from the α-transitions of the respective components disappear, and a new single loss peak peculiar to the composition, namely a single glass transition temperature, is observed in the dynamic mechanical measurement. In the present invention, it is necessary that the components (A) and (B) are compatible with each other.

The modified PPO prepared by the gas phase graft polymerization is compatible with AS resin with a lower rate of grafting than that of the modified PPO prepared by other polymerization methods such as solution polymerization and suspension polymerization, to provide a composition having excellent properties. The reason is considered to be that the graft polymer prepared by a gas phase graft polymerization has plural grafting branches per one trunk polymer.

The content of PPO in a modified PPO is relatively decreased with increasing the rate of grafting of the modified PPO, and the properties that PPO possesses are impaired. In contrast, the lower the rate of grafting, the lower the degree of modification, and the modified PPO becomes incompatible with the AS resin. A preferable rate of grafting is from 3 to 200%, especially from 5 to 100%. The "rate of grafting" as used herein shows a value calculated according to the following equation.

$$\text{Rate of grafting (\%)} = \frac{\text{Weight of grafting polymer portion}}{\text{Weight of charged PPO}} \times 100$$

The contents of an acrylonitrile compound in the modified PPO (A) and the AS resin (B) can be selected from a wide range according to the purposes. When the content is small, properties as expected are not revealed on solvent resistance and mechanical property. Although the transparency can be determined by a simple experiment, it can be roughly confirmed by calculation from a SP value (solubility parameter) of each component. However, even if the SP values of the modified PPO (A) and the AS resin (B) agree with each other, the both are not always compatible. Therefore, it is the most accurate to judge the compatibility on the basis of the transparency and the measurement of glass transition temperature. The content of the acrylonitrile compound in the grafting branch of the modified PPO (A) is selected from 5 to 100% by weight. Preferably, the content of the acrylonitrile compound is selected from 5 to 80% by weight. The content of acrylonitrile in the component (B) is selected from 1 to 50% by weight, preferably 3 to 35% by weight.

The AS resin (B) to be blended with the modified PPO (A) must be a random copolymer. The AS resin can be prepared by any polymerization methods such as emulsion polymerization and bulk polymerization. The AS resin must have a composition such that it is compatible with the modified PPO or when blended with the modified PPO, it provides a transparent blend.

Blending of the components (A) and (B) can be made by various known methods, e.g. a mechanical blending method using a kneader, an extruder, a roll mill or other blenders, solution blending, emulsion blending and other suitable blending methods.

The mixing ratio of the component (A) to the component (B) is selected from 1/99 to 99/1 by weight, preferably 5/95 to 80/20 by weight.

An elastomer, including a modified elastomer which is obtained by graft polymerization of one or more kinds of vinyl monomers containing at least one monomer selected from acrylonitrile compounds and styrene compounds in the presence of an elastomer, may be incorporated into the composition of the present invention for the purpose of increasing the impact strength. Examples of the elastomer are polybutadiene, styrene-butadiene copolymer, polyisoprene, ethylene-propylene copolymer, polyacrylates and other rubber-like materials. It is preferable that the branch portion grafting onto the elastomer has such a composition as being compatible with the components (A) and (B). The elastomer is employed in an amount of 0 to 100 parts by weight per 100 parts by weight of the mixture of the components (A) and (B). Preferably, the elastomer is employed in an amount of 0 to 70 parts by weight per 100 parts by weight of the mixture of the components (A) and (B), since if a large amount of the elastomer is employed, there is the possibility of impairing excellent properties of the composition of the invention.

A resin composition having the desired properties can also be obtained by blending the modified PPO with an acrylonitrile-butadiene-styrene copolymer instead of blending with the AS resin and the elastomer.

The resin composition of the present invention can be expanded by a mechanical or physical foaming method. Polystyrene, AS resin, ABS resin, polyethylene, polyvinyl chloride and modified PPO are known as representative thermoplastic expandable resins, and among them, a modified PPO foam is utilized as a heat resistant foam. However, the modified PPO foam is in danger of causing melting or shrinking in uses for which the hydrocarbon resistance is required, and is not usable. The AS resin foam has a good hydrocarbon resistance, but the heat resistance of the AS resin foam is only on the same degree as or slightly higher than that of a polystyrene foam and cannot stand comparison with the heat resistance of the modified PPO foam.

The composition of the present invention can provide a foam of high utility value having both heat resistance and hydrocarbon resistance.

Chemical foaming of the composition of the invention is conducted by utilizing usual organic or inorganic foaming agents. Organic foaming agents are preferable in view of the shape of cells and the physical properties of the foams. Azo compounds, N-nitroso compounds, sulfonylhydrazides and the like are employed as organic foaming agents. Typical examples of the organic foaming agent are azobisformamide, azobisisobutyronitrile, azoaminobenzene, N,N'-dimethyl-N,N'-dinitrosoterephthalamide, N,N-dinitrosopentamethylenetetramine, benzenesulfonylhydrazide, toluene-(4)-sulfonylhydrazide and 4,4'-oxobis(benzenesulfonylhydrazide). The foaming agents may be employed alone or in combination with a foaming assistant in consideration of the decomposition temperature thereof.

As physical foaming methods, there are adopted a method in which an inert gas such as nitrogen gas or carbon dioxide gas which is generally employed as an expanding agent, is added to a molten resin under pressure, and the resin is placed in a low pressure portion to expand the resin, and a method in which a hydrocarbon soluble in a resin such as butane, pentane, toluene or xylene is added to the resin and the resin is heated to a temperature higher than the boiling point of the hydrocarbon and higher than the softening point of the resin.

The expansion molding can be made by extrusion, injection molding and any other methods for molding expandable resins. Also, it is possible to adopt a method in which a composition containing a foaming agent is pelletized and the pellets are heated and pressurized to mold.

The resin composition of the present invention may contain additives such as stabilizer, plasticizer, flame retardant, an agent for improving processability, glass fiber, carbon fiber, calcium carbonate and other fillers, and pigment.

The present invention is more specifically described and explained by means of the following Examples. It is to be understood that the present invention is not limited to the Examples, and various changes and modifications may be made in the invention without departing from the spirit and scope thereof.

EXAMPLE 1

A 300 ml. autoclave was charged with 40 g. of poly(2,6-dimethyl-1,4-ether) having an intrinsic viscosity $[\eta]$ of 0.43 (at 25° C. in chloroform), 80 g. of ethyl-benzene, 28 g. of styrene, 12 g. of acrylonitrile and 4 g. of dicmyl peroxide. After replacing the air in the autoclave with nitrogen gas and closing the autoclave, the content was dissolved by agitating at 60° C. for 30 minutes. The temperature was then elevated to 120° C., and the reaction was carried out at that temperature for 5 hours.

The reaction product was dissolved in toluene to give a 5 w/v % solution, and methanol was added to the solution in an amount of 10 times the volume of the solution to give a resin powder. After drying the powder, a free acrylonitrile-styrene copolymer was removed from the powder by extracting with methyl ethyl ketone in Soxhlet extractor. The powder is then dissolved in methylene chloride to give a 5 w/v % solution, and after allowing to stand at 23° C. for 48 hours, the solution was filtered. The filtrate was placed in an oven at 50° C. and methylene chloride was evaporated to give a dry resin. The dry resin was dissolved again in methylene chloride to give a 5 w/v % solution, and the solution was allowed to stand at 23° C. for 48 hours. The solution was filtered, and a resin was recovered from the filtrate by evaporating methylene chloride. The resin was subjected to the elemental analysis and infrared analysis. The composition of the resin was as follows:

| PPO component | 75.80 wt. % |
|---|---|
| Styrene component | 16.19 wt. % |
| Acrylonitrile component | 8.01 wt. % |

The thus obtained resin was admixed with an acrylonitrile-styrene copolymer having an acrylonitrile content of 25.7% by weight in a ratio of 1:1 by weight. The mixture was dissolved in toluene, and the solution was added to methanol to obtain a blended resin (A) as a precipitate.

After drying, the blended resin (A) was subjected to press molding to give a transparent sheet having a thickness of 0.045 cm. After annealing the sheet in a vacuum drier at 120° C. for 6 hours, the dynamic mechanical measurement was made, and as a result, only one peak of tan δ was observed at the position of 180° C.

As comparison, there was prepared in the same manner as above a sheet of a blend (B) of equal amounts of poly(2,6-dimethyl-1,4-ether) having an intrinsic viscosity $[\eta]$ of 0.43 (at 25° C. in chloroform) and an acrylonitrile-styrene copolymer having an acrylonitrile content of 25.7% by weight. The observation of the transparency and the dynamic mechanical measurement were made. As a result, this comparative sheet (B) was opaque, and two peaks of tan δ were observed at 135° C. and 240° C. From these results, it is clear that poly(2,6-dimethyl-1,4-ether) and the acrylonitrile-styrene copolymer are not compatible with each other.

The hydrocarbon resistance of the blend (A) and the blend (B) was compared by immersing the sheets (A) and (B) in n-heptane for 5 hours and observing the appearance of the sheets. No change was observed in the sheet (A), but the surface of the comparative sheet (B) was rough.

EXAMPLE 2

The procedure of Example 1 was repeated except that the methylene solution was allowed to stand for 72 hours. The results were the same as those of Example 1.

EXAMPLE 3

To 30 g. of poly(2,6-dimethyl-1,4-ether) having an intrinsic viscosity $[\eta]$ of 0.45 (at 25° C. in chloroform) was added 1.5 g. of t-butyl peroxybenzoate dissolved in 90 ml. of acetone. After agitation, acetone was evaporated. The mixture was placed in a cylindrical reactor having a diameter of 2 cm. and a length of 10 cm. and equipped with perforated glass plates at the both ends. After replacing the air in the reactor with nitrogen gas, the reactor was dipped in an oil bath of 120° C. and the gas phase graft polymerization was carried out by introducing from one end of the reactor a nitrogen gas containing a styrene/acrylonitrile mixed monomer vapor in a ratio of 1:2 by weight. After conducting the polymerization for 6 hours, the reaction mixture was taken out, and a portion soluble in methyl ethyl ketone was removed by employing a Soxhlet extractor. After drying the product, it was dissolved in methylene chloride to give a 5 w/v % solution and the solution was allowed to stand at 23° C. for 72 hours. After 72 hours, the solution was transparent. The product had the following composition.

| PPO component | 62.4 wt. % |
|---|---|
| Styrene component | 16.9 wt. % |
| Acrylonitrile component | 20.7 wt. % |

The thus obtained modified PPO was blended with an acrylonitrile-styrene copolymer having an acrylonitrile content of 28.5% by weight which was prepared by an emulsion polymerization, in a ratio of 1:1 by weight, and the blend was treated in the same manner as in Example 1 to give a transparent sheet (C) having a thickness of 0.047 cm. After annealing the sheet (C) in the same manner as in Example 1, the dynamic mechanical measurement was made. As a result, a single peak of tan δ was observed in the vicinity of 175° C.

As comparison, a sheet (D) was prepared in the same manner as in Example 1 by employing a blend of the same poly(2,6-dimethyl-1,4-ether) and acrylonitrile-styrene copolymer as used in the above. The sheet (D) was opaque. As a result of the dynamic mechanical measurement, peaks of tan δ were observed at two positions. Also, the hydrocarbon resistance of the sheet (C) of Example 3 and the comparative sheet (D) was examined. No change was observed in the sheet (C), but the surface of the sheet (D) was rough.

EXAMPLE 4

The graft polymerization was carried out in the same manner as in Example 3 except that α-methylstyrene was employed instead of styrene. The obtained modified PPO had the following composition.

| PPO component | 68.3 wt. % |
|---|---|
| α-Methylstyrene component | 13.6 wt. % |
| Acrylonitrile component | 18.1 wt. % |

The modified PPO was blended with the same acrylonitrile-styrene copolymer as used in Example 1 in a ratio of 1:1 by weight, and a sheet was prepared and the dynamic mechanical measurement and the measurement of the hydrocarbon resistance were made in the same manner as in Example 1. The sheet was transparent, and only one peak of tan δ was observed in the vicinity of 195° C. Also, no change was observed on the surface of the sheet dipped in n-heptane.

EXAMPLE 5

To 100 parts by weight of the blended resin (A) obtained in Example 1 was added 20 parts by weight of a vinyl polymer-grafting elastomer (E) prepared by graft-polymerizing 28% by weight of styrene, 8% by weight of acrylonitrile and 4% by weight of methyl methacrylate onto 60% by weight of polybutadiene. The mixture was blended at 180° C. for 5 minutes, and was pressed to give a sheet (F) having a thickness of 1.50 mm.

As comparison, 20 parts by weight of the vinyl polymer-grafting elastomer (E) was added to 100 parts by weight of the blend (B) obtained in Example 1. The mixture was blended and pressed in the same manner as above to give a sheet (G) having a thickness of 1.50 mm.

Each of the sheets (F) and (G) was cut to a specimen having a width of 1.0 cm. and a length of 10 cm., and it was bent at an angle of 180° in the middle. Bending of the specimen (F) was repeated 5 times, but it was not broken. The specimen (G) was broken by only one bending.

In addition to the ingredients used in the Examples, other ingredients can be used in the Examples as set forth in the specification to obtain substantially the same results.

What we claim is:

1. A resin composition comprising (A) 1 to 99 parts by weight of a modified polyphenylene oxide prepared by graft polymerization of an acrylonitrile compound or a monomer mixture containing an acrylonitrile compound and a styrene compound in the presence of polyphenylene oxide, said modified polyphenylene oxide having a degree of graft modification such that the no precipitate forming time as determined by a methylene chloride test conducted at 23° C. by employing a 5 w/v % methylene chloride solution is at least 48 hours, and (B) 99 to 1 parts by weight of a polymer compatible with said modified polyphenylene oxide (A); the polymer (B) being a random copolymer containing units of an acrylonitrile compound and units of a styrene compound or an acrylonitrile-butadiene-styrene copolymer, and the blend of the components (A) and (B) having a transparency such that the haze value is not more than 5.0%.

2. The composition of claim 1, wherein the monomer mixture to be polymerized by said graft polymerization comprises another vinyl compound copolymerizable with said acrylonitrile compound or said styrene compound.

3. The composition of claim 1, wherein the polymer (B) is a random copolymer of the acrylonitrile compound with the styrene compound.

4. The composition of claim 1, wherein the polymer (B) is a random copolymer of the acrylonitrile compound, the styrene compound and a vinyl compound, other than the acrylonitrile and styrene compound, copolymerizable with the acrylonitrile compound or the styrene compound.

5. The composition of claim 1, which is transparent.

6. The composition of claim 1, which shows a single loss peak in a dynamic mechanical measurement by torsion braid analysis of the glass transition temperature.

7. The composition of claim 1, which contains 0 to 100 parts by weight of an elastomer per 100 parts by weight of a mixture of the components (A) and (B).

8. The composition of claim 1, wherein said graft polymerization for preparing said modified polyphenylene oxide is a gas phase graft polymerization in which the acrylonitrile compound or the monomer mixture is polymerized in the gaseous phase in the presence of solid polyphenylene oxide and a radical polymerization initiator at polymerization temperature.

9. The composition of claim 1, wherein the acrylonitrile compound comprises acrylonitrile or methacrylonitrile and the styrene compound comprises styrene, monochlorostyrene, dichloro-styrene, α-methylstyrene, p-methylstyrene, p-phenylstyrene and 2,4-dimethylstyrene.

10. The composition of claim 1, wherein the rate of graft modification of said modified polyphenylene oxide is such that the no precipitate-forming time is at least 72 hours.

11. The composition of claim 1, wherein the content of the acrylonitrile compound in the grafted portion of the modified polyphenylene oxide (A) is from 5 to 100% by weight and the content of the acrylonitrile compound in polymer (B) is from 1 to 50% by weight.

12. The composition of claim 1, wherein the mixing ratio of the modified polyphenylene oxide (A) to compound (B) is 5/95 to 80/20 by weight.

13. The composition of claim 12, wherein the content of the acrylonitrile compound in the modified polyphenylene oxide (A) is 5 to 80% by weight and the content of the acrylonitrile compound in the polymer (B) is 3 to 35% by weight.

* * * * *